United States Patent
Hedayat et al.

(10) Patent No.: US 8,451,771 B2
(45) Date of Patent: May 28, 2013

(54) MEDIUM RESERVATION TECHNIQUES FOR MULTI-USER TRANSMISSIONS

(75) Inventors: Ahmadreza Hedayat, Allen, TX (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 12/966,118

(22) Filed: Dec. 13, 2010

(65) Prior Publication Data

US 2012/0147804 A1 Jun. 14, 2012

(51) Int. Cl.
*H04B 7/212* (2006.01)

(52) U.S. Cl.
USPC ......... 370/322; 370/349; 370/395.4; 370/445

(58) Field of Classification Search
USPC ................ 370/310, 349, 312, 329, 326, 321, 370/339, 344, 345, 348, 461, 462, 445
See application file for complete search history.

(56) References Cited

U.S. PATENT DOCUMENTS

| | | |
|---|---|---|
| 7,184,407 B1 | 2/2007 | Myles et al. |
| 7,385,945 B1 | 6/2008 | Olson et al. |
| 7,408,907 B2 | 8/2008 | Diener |
| 7,424,268 B2 | 9/2008 | Diener et al. |
| 7,760,692 B2 | 7/2010 | Chen et al. |
| 7,872,997 B2 | 1/2011 | Qian |
| 2010/0080173 A1 | 4/2010 | Takagi |
| 2010/0309871 A1 | 12/2010 | Fischer et al. |
| 2011/0149918 A1* | 6/2011 | Gong et al. ............... 370/336 |
| 2011/0317630 A1* | 12/2011 | Zhu et al. ................. 370/329 |

OTHER PUBLICATIONS

Tian Kaibo et al., "Multiple CTSs in MU-MIMO Transmission," IEEE 802.11-10/1067r0, Sep. 15, 2010.
Yuichi Morioka et al., "Multi-RTS Proposal," IEEE 802.11-10/1124r02, Sep. 12, 2010.
International Search Report and Written Opinion in International Application No. PCT/US2011/060539, mailed Mar. 13, 2012.

* cited by examiner

*Primary Examiner* — Brenda H Pham
(74) *Attorney, Agent, or Firm* — Edell, Shapiro & Finnan, LLC

(57) ABSTRACT

Techniques are provided for a multi-user reservation sequence used when transmitting a multi-user transmission in a wireless network. At a wireless access point device configured to operate in a wireless network, a multi-user request-to-send packet is transmitted as part of a multi-user reservation sequence prior to a multi-user transmission from the wireless access point device to a plurality of wireless client devices that are the intended recipients for the multi-user transmission. The multi-user request-to-send packet comprises duration information and address information configured to address at least some of the plurality of wireless client devices. Clear-to-send packets transmitted from two or more of the plurality of wireless client devices in response to the multi-user request-to-send packet are received at the wireless access point device. Each clear-to-send packet comprises identical content. In some scenarios, the multi-user request-to-send packet is preceded by a single-user request-to-send packet directed to a designated wireless client device.

28 Claims, 11 Drawing Sheets

At a wireless access point device configured to operate in a wireless network, an MRTS packet is transmitted as part of a multi-user reservation sequence prior to a multi-user transmission from the wireless access point device to a plurality of wireless client devices that are the intended recipients for the multi-user transmission, the MRTS packet comprising duration information and information configured to address some or all of the plurality of wireless client devices — 110

Receive CTS packets transmitted from two or more of the plurality of wireless client devices, each CTS packet that is responsive to the MRTS packet comprising identical content — 120

Send the multi-user transmission to the plurality of wireless client devices — 130

| At a wireless client device configured to operate in a wireless network, receive a MRTS packet transmitted by a wireless access point device that comprises duration information and information configured to address some or all of the plurality of wireless client devices that are the intended recipients for the multi-user transmission | 210 |

| When the MRTS packet is determined to be addressed to the wireless client device, generate a CTS packet using information contained in the MRTS packet so that the CTS packets sent by the plurality of wireless client devices comprise identical content, and determine when to transmit the CTS packet based on information in the MRTS packet | 220 |

| Transmit the CTS packet from the wireless client device | 230 |

MEDIUM RESERVATION TECHNIQUES FOR MULTI-USER TRANSMISSIONS

TECHNICAL FIELD

The present disclosure relates to medium reservation techniques for multi-user transmissions.

BACKGROUND

Multi-user transmission is a feature that involves transmitting data simultaneously to multiple intended recipient devices, for example, by aggregating frequency channels and using multiple-input multiple-output (MIMO) transmission techniques to spatially multiplex signals to the different recipient devices. For example, multi-user transmission techniques are employed in the IEEE 802.11ac very high throughput (VHT) amendment to the IEEE 802.11 wireless communication protocol. While multi-user transmissions significantly increase the throughput, they require conventional medium reservation techniques to be revisited.

One medium reservation technique is the request-to-send/clear-to-send (RTS/CTS) procedure. The purpose of the RTS/CTS exchange is to reserve the medium for the transmission by the initiator while giving protection to both the initiator and responder against any interfering transmissions initiated by other devices in the neighborhood of the initiator and responder. This is particularly important when there is overlap between Basic Service Sets of wireless access point devices in wireless local area networks (WLANs).

BRIEF DESCRIPTION OF THE DRAWINGS

FIG. 7 is an example of a flow chart depicting operations performed in the wireless access point device during the multi-user reservation sequence.

FIG. 8 is an example of a flow chart depicting operations performed in a wireless client device during the multi-user reservation sequence.

DESCRIPTION OF EXAMPLE EMBODIMENTS

Overview

Techniques are provided for a multi-user reservation sequence used when transmitting a multi-user transmission in a wireless network. At a wireless access point device configured to operate in a wireless network, a multi-user request-to-send packet is transmitted as part of a multi-user reservation sequence prior to a multi-user transmission from the wireless access point device to a plurality of wireless client devices that are the intended recipients for the multi-user transmission. The multi-user request-to-send packet comprises duration information and address information configured to address at least some of the plurality of wireless client devices. Clear-to-send packets transmitted from two or more of the plurality of wireless client devices in response to the multi-user request-to-send packet are received at the wireless access point device. Each clear-to-send packet comprises identical content. Similarly, at a wireless client device configured to operate in a wireless network, a multi-user request-to-send packet transmitted by a wireless access point device is received, the multi-user request-to-send packet comprising duration information and address information configured to address at least some of the plurality of wireless client devices that are the intended recipients for the multi-user transmission. When the multi-user request-to-send packet is determined to be addressed to the wireless client device, the wireless client device generates a clear-to-send packet using information contained in the multi-user request-to-send packet so that the clear-to-send packets sent by the plurality of wireless client devices comprise identical content. The wireless client device transmits the clear-to-send packet.

Example Embodiments

Figure 1:
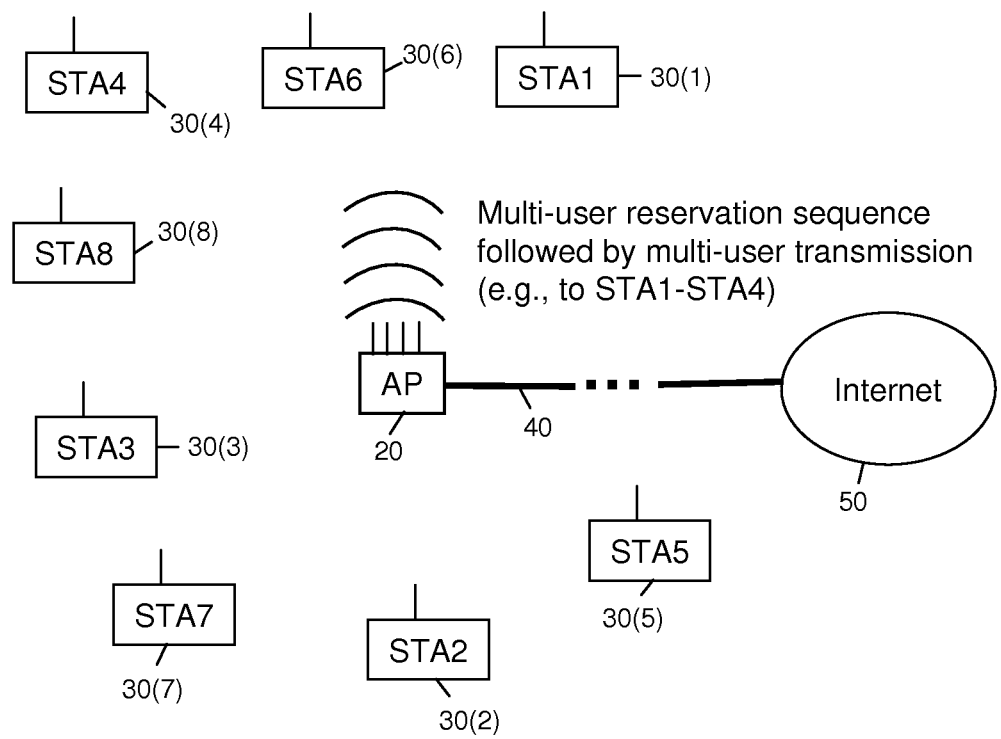
FIG. 1 is a diagram depicting a wireless communication network in which a wireless access point device and wireless client devices are configured to perform a multi-user reservation sequence in advance of a multi-user transmission.

Referring first to FIG. 1, a wireless communication network is shown generally at reference numeral 10, comprising a wireless access point (AP) 20 and a plurality of wireless stations (STAs) 30(1)-30(8). The AP may serve more than eight STAs but for purposes of the examples described herein, FIG. 1 shows only eight STAs. The AP 20 and STAs 30(1)-30(8) are configured to operate in accordance with a wireless network communication protocol or standard, such as the IEEE 802.11 wireless local area network (WLAN) communication protocol. Another term for a STA is a wireless client device.

In recent advances to wireless networks, such as an IEEE 802.11 WLAN, an AP may simultaneously transmit multiple data streams to multiple intended recipient STAs. This is known as a multi-user (MU) transmission. In one form of a multi-user transmission, the AP uses multiple-input multiple-output (MIMO) techniques to simultaneously spatially multiplex multiple data streams to different STAs. Moreover, the AP may aggregate multiple frequency channels in the frequency band in order to obtain increased bandwidth for the multi-user transmission. Channel aggregation and MU transmissions are features to be supported by the IEEE 802.11ac standard for very high throughput (VHT) support. Another aggregation technique is a downlink-orthogonal frequency division multiplexed access (DL-OFDMA) transmission. Generally, in multiuser aggregation methods, with a single transmission of a physical-layer packet, independent messages are sent to multiple clients. MIMO-MU and DL-OFDMA are two forms of multiuser aggregation. Various forms of multiuser aggregation can be combined together for still greater benefits. The techniques described herein are applicable to all multiuser aggregation methods.

In a given system deployment, an AP may be serving some STAs that are configured to support VHT, e.g., IEEE 802.11ac STAs, including MU transmissions, as well as so-called "legacy" STAs that are not configured to participate in MU transmissions. Nevertheless, the more advanced STAs (e.g., IEEE 802.11a clients) and the legacy STAs (e.g., IEEE 802.11a and 802.11n clients) may be operating in proximity to each other and compete for access to the spectrum with each other.

When sending a MU transmission, the AP needs to first reserve the wireless channel or channels to be used for the MU transmission. Since the AP may be serving both MU-capable STAs and legacy STAs, the medium reservation techniques need to be understood by legacy devices, such as IEEE 802.11a and 802.11n clients, and should consume a minimum amount of medium time. For example, in FIG. 1, STAs 30(1), 30(2), 30(3) and 30(4) are advanced STAs that are capable of participating in a MU transmission, whereas one or more of STAs 30(5)-30(8), which are in radio frequency proximity to STAs 30(1)-30(4), are legacy STAs. Accordingly, the AP 20 is configured to initiate a multi-user reservation sequence prior to making a multi-user transmission. The multi-user reservation sequence, examples of which are described hereinafter, is configured to reserve the wireless medium for the advanced STAs and yet be sufficiently understood by the legacy STAs so that the legacy STAs stay off the wireless medium during the multi-user transmission.

The following reservation techniques involve enhancements to a Request-to-Send/Clear-to-Send (RTS/CTS) procedure. The conventional RTS/CTS procedure is configured to alert the intended recipient device of an imminent transmission and also to alert neighboring devices to stay off the wireless medium during the transmission. When a neighboring device detects an RTS packet or frame transmitted by an initiator device (e.g., the AP 20), that neighboring device sets its Network Allocation Vector (NAV) accordingly so that it does not transmit on the channel for a period of time indicated by a Duration field in the RTS packet. However, when the neighboring device does not detect a follow-up CTS packet or does not detect data transmitted by the initiator device, then the neighboring device resets its NAV. When there are multiple recipient devices that are each to respond to an RTS packet for a MU transmission, there is a chance that a neighboring device may miss a CTS packet from one or more of the recipient devices and consequently reset its NAV. The multi-user reservation sequences described herein are configured to minimize the chance that a neighboring device may miss a CTS packet, yet efficiently use the wireless medium.

Figure 2:
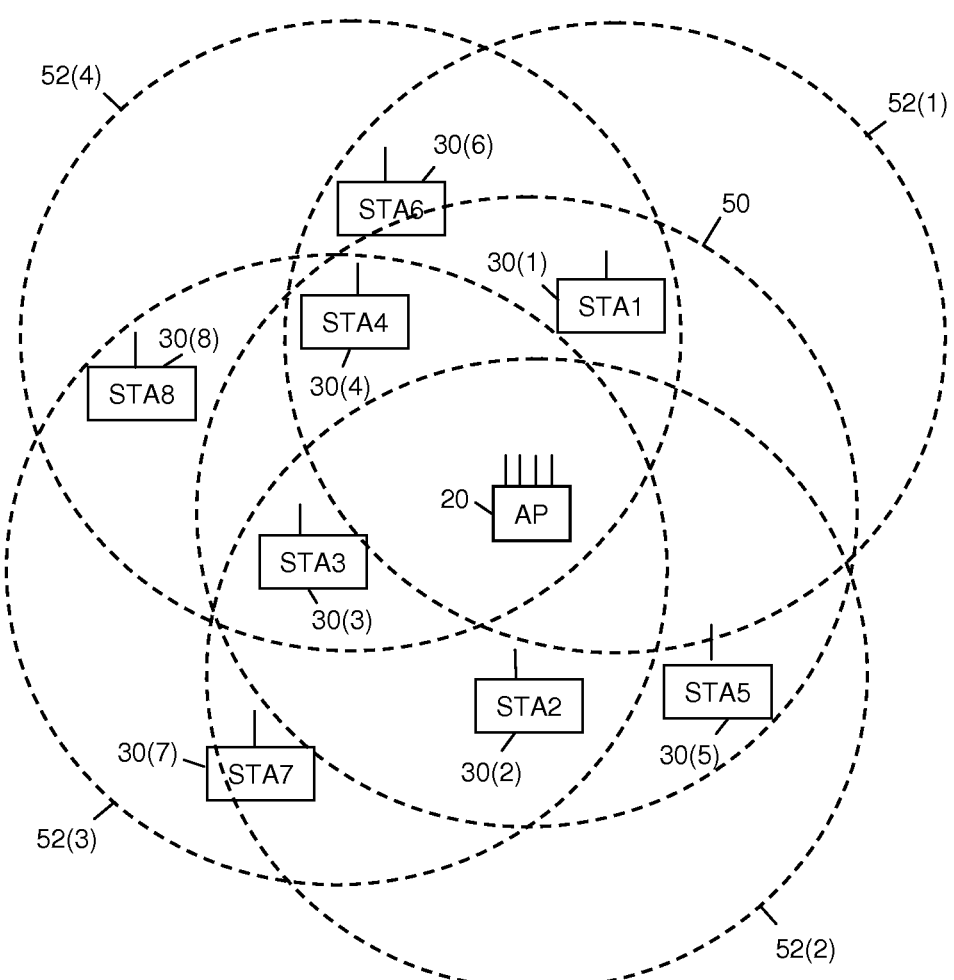
FIG. 2 is a diagram depicting coverage of request-to-send sent by the wireless access point device and clear-to-send packets sent by wireless client devices.

Reference is now made to FIG. 2. FIG. 2 shows an example of the coverage of an RTS packet sent by the AP 20 and the coverage of CTS packets sent by various STAs in response to the RTS packet received from the AP 20. Before the AP 20 sends a transmission to any of the STAs, it will send an RTS packet for reception by that STA. The coverage of the RTS packet from the AP 20 is shown by the dotted line 50. Likewise, when any of the STAs receives an RTS packet addressed to it, it responds with a CTS packet. FIG. 2 shows the coverage of the CTS packets from STAs 30(1)-30(4), as an example, at reference numerals 52(1)-52(4), respectively. Thus, when the AP 20 has a multi-user transmission to send, for example, to STAs 30(1)-30(4), the other STAs served by the AP 20, and any other STAs served by an AP from an Overlapped Basic Service Set (OBSS), will receive the RTS packet for that multi-user transmission. For example, STAs 30(5)-30(7) will receive the RTS packet from the AP 20 but STA 30(8) will not Likewise, the STAs 30(5)-30(8) will receive the CTS from one or more of the STAs 30(1)-30(4). Therefore, the reservation sequence used by the AP 20 needs to accommodate neighboring STAs, some of which may be legacy STAs. In order to address scenarios like those depicted in FIG. 2, multi-user channel reservation techniques are provided herein for use prior to a multi-user transmission.

Figure 3:
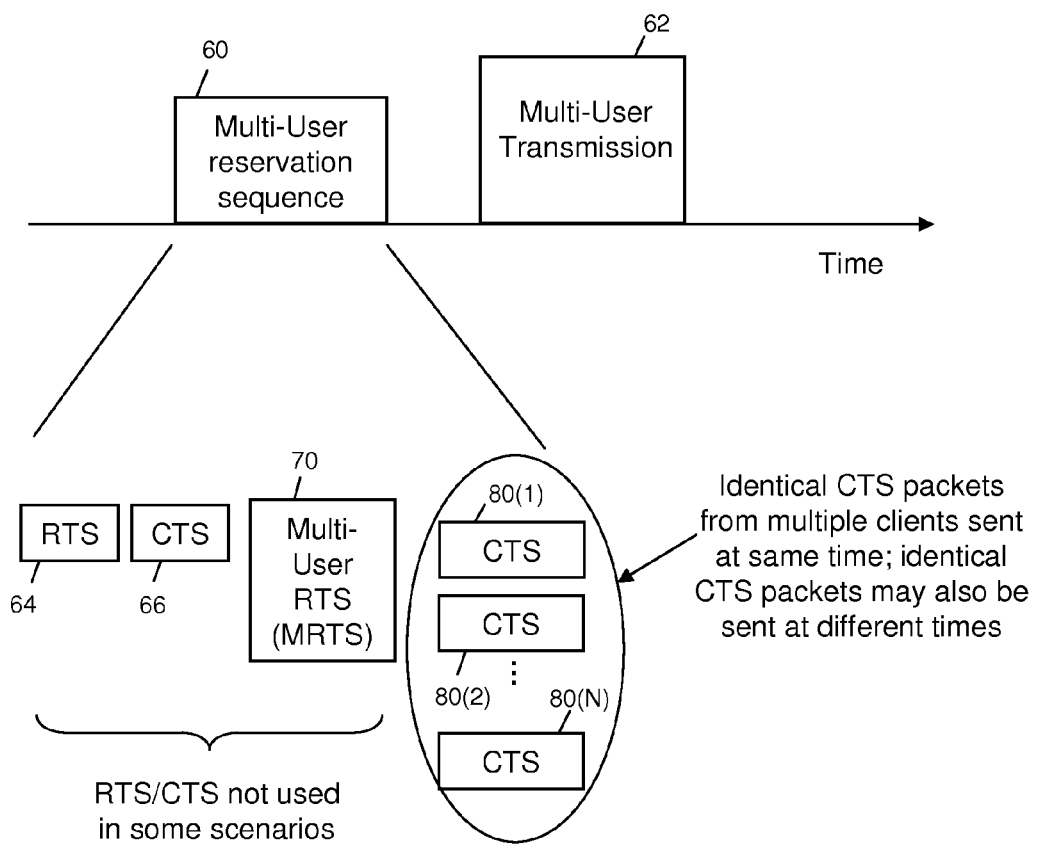
FIG. 3 is a timing diagram generally depicting a multi-user reservation sequence prior to a multi-user transmission to be sent by the wireless access point device.

Turning now to FIG. 3, a general timing diagram is shown of a multi-user reservation sequence 60 that precedes a multi-user transmission 62. The multi-user reservation sequence 60 features a multi-user RTS (MRTS) packet 70 and multiple identical CTS packets 80(1)-80(N). Some or all of the CTS packets 80(1)-80(N) are to be sent at the same time by respective intended recipient devices of a multi-user transmission and as a result they will collide with each other, but this is a permissible consequence as described hereinafter. The multi-user reservation sequence 60 also comprises, in some forms, a standard single-user RTS/CTS exchange shown at 64 and 66.

The MRTS Packet

Figure 4:
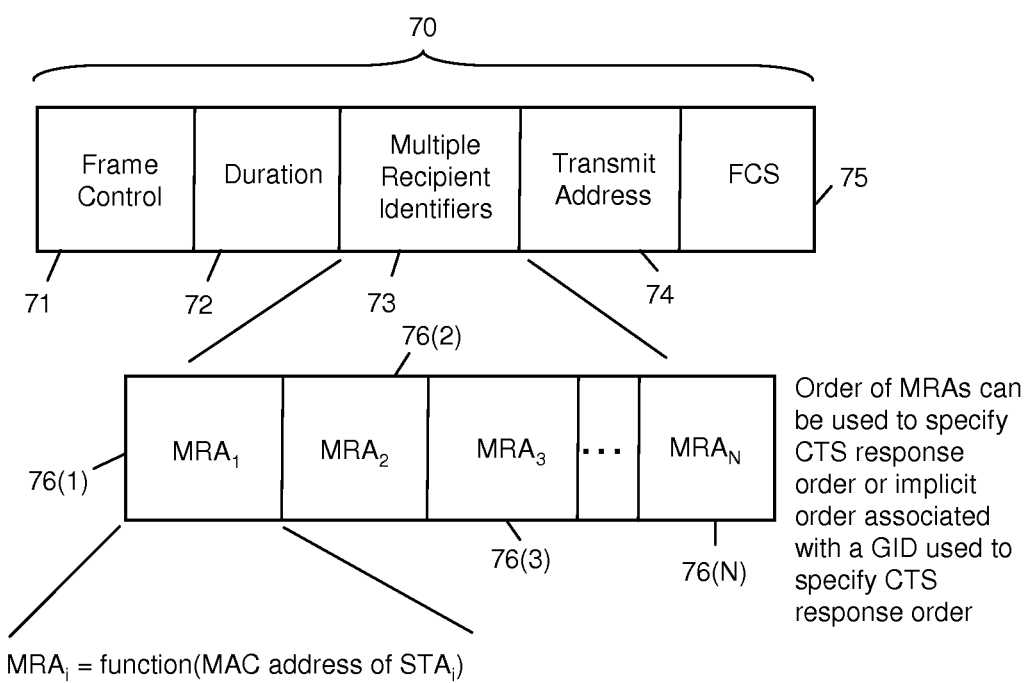
FIG. 4 illustrates an example of format of a multi-user request-to-send packet sent by the wireless access point device in the multi-user reservation sequence.

Turning now to FIG. 4, with continued reference to FIG. 3, the MRTS packet 70 is described in more detail. The MRTS packet 70 is an RTS packet in which several STAs are identified as responders. Similar to a legacy RTS packet (or any IEEE 802.11 frame transmitted in a WLAN), the MRTS packet 70 is configured inform the recipient devices as to how long the wireless medium is to be busy for the multi-user transmission so that the recipient devices set their NAVs accordingly.

The MRTS packet 70 may be configured as a modification of a legacy or standard single-user RTS packet, so that the NAV reset rule is still available to legacy clients. In another form, the MRTS packet 70 is a new control frame understood for VHT-STAs only.

In one form, the MRTS packet 70 comprises the same fields as a standard single-user RTS packet except that it has information indicating that there are multiple intended recipients for an upcoming transmission from the AP. To this end, the MRTS packet 70 comprises a Frame Control field 71, a Duration field 72, a Multiple Recipient Identifiers field 73, a Transmit Address field 74 and a Frame Check Sequence (FCS) field 75. Fields 71, 72, 74 and 75 are the same as for a standard single-user RTS packet. The Duration field 72 indicates the time duration that devices should stay off the channel(s) and is used by recipient devices to set their NAVs. The Transmit Address field 74 indicates the medium access control (MAC) address of the AP 20 or of any device that is initiating a multi-user reservation sequence. The FCS field 75 is used to enable recipient devices to perform error checking and correcting of the packet. Of interest for the MRTS packet 70 is the Multiple Recipient Identifiers field 73.

The Multiple Recipient Identifiers field 73 comprises information indicating some or all of a plurality of wireless client devices, e.g., STAs, that are the intended recipients of an impending multi-user transmission. In one form, the Multiple Recipient Identifiers field 73 is configured to appear or be construed, when decoded by legacy devices (devices other than those capable of participating in a multi-user transmission), the same as the Receive Address field in a standard single-user RTS packet, but when decoded by MU-capable devices, it provides information to the recipient devices as to how to respond to the MRTS packet.

There are various ways to indicate all the clients intended for a multi-user transmission in the MRTS packet 70. For example, the Multiple Recipient Identifiers field 73 comprises an ordered sequence of multi-user recipient address (MRA) subfields 76(1)-76(N) for N recipient devices for the multi-user transmission when the MRTS packet 70 is configured to address all recipient devices. (As will become apparent hereinafter, there are forms of the multi-user reservation sequence 60 that use a standard RTS/CTS mechanism directed to one of the recipient devices of a multi-user transmission and the MRTS packet 70 is used to inform the remaining recipient devices of the multi-user transmission.) Each MRA subfield 76(1)-76(N) is configured to identify a respective recipient device of a multi-user transmission.

In one form, each MRA subfield 76(1)-76(N) comprises a bit pattern that is function of a MAC address of a corresponding recipient device of a multi-user transmission, e.g., $MRA_i$=function (MAC address of $STA_i$). For example, $MRA_i$ comprises all or a subset of the bits of the MAC address for $STA_i$. In another form, each MRA subfield comprises a bit pattern that is a function of the association identifier (AID), e.g., $MRA_i$=function(AID of $STA_i$), such as part or all of the bits of the AID. An AID is used by an AP to identify a STA when it has associated with an AP for delivery of buffered frames. In still another form, a group identifier (GID) that is used to identify a group of STAs (e.g., IEEE 802.11ac group) that are participants of a multi-user transmission, may be used to generate the information in the MRA subfields. When a STA is part of a multi-user group, it is configured to recognize a GID assigned by the AP for that group in order to know when to expect a multi-user transmission for which it is to participate. Thus, each MRA subfield 76(1)-76(N) may be a function of the GID for a multi-user group alone or in combination with the MAC address of the STA and/or the AID of the STA, e.g., $MRA_i$=function (GID, and/or MAC address of $STA_i$, and/or AID of $STA_i$).

In order to make the MRTS packet 70 appear as a legacy RTS packet to legacy devices, the size or length of the field 73 is made to be the same as that of a legacy RTS packet, that is, within the size of a MAC address, so that the MRTS packet is compatible with legacy devices.

Information is included in the MRS packet 70 that indicates an order for respective ones of the plurality of STAs to transmit their CTS packets, where the order of transmission of the CTS packets is indicated by order of STA address information contained in a field in the MRTS packet 70. As explained further hereinafter, the order of the MRAs in the field 73 is used, in some forms of the multi-user reservation sequence 60, to indicate the order or timing that those devices should respond with a CTS packet. For example, the device identified in MRA subfield 76(1) would be the first to send a CTS packet following the MRTS packet by a time period equal to the Short InterFrame Spacing (SIFS), which in general is a fixed value according to the rules of the communication protocol. The device identified by MRA subfield 76(2) would be the second to send a CTS packet, separated by an SIFS from the CTS of the first device, and so on. Alternatively, a GID assigned by the AP may be used to implicitly indicate the CTS response order when a GID is used in the MRTS packet 70. In other words, the GID is configured in such a manner that a certain device in the group is a "primary" device and others are secondary devices, and the designated primary device is to respond with a CTS packet prior to secondary devices.

Collided CTS Packets

As explained above in connection with FIG. 3, in some forms of the multi-user reservation sequence 60, multiple recipient devices respond with an identical CTS packet at the same time so that they "collide" at the receiver of any device that receives the CTS packets, such as at the AP 20 that is expecting to receive the CTS packets and at other devices in radio frequency (RF) proximity to the detect the CTS packets.

Some features are now described that are designed to ensure that the sum of all the CTS packets is detectable by a receiver in a device that is may receive the overlapping CTS packets, e.g., at the AP 20. First, those STAs that are configured to participate in a multi-user transmission, e.g., IEEE 802.11ac VHT clients, are configured to respond to the MRTS packet 70 with a CTS packet and to use a scrambling seed deterministically set by the scrambler seed of the MRTS packet 70. This ensures that multiple responders for a given multi-user reservation sequence use the same scrambling seed. For example, the STAs are configured to use exactly the same seed as the MRTS packet, the same seed plus 1, the same seed bit reversed, etc., with additional rules to avoid an all-zeros seed. Since all of these VHT STAs are configured to use a common seed, the binary content of each of the CTS packets that they generate and send is identical, and any device that receives these CTS packets will interpret them as multiple copies of the same CTS packet, due to OFDM transmission properties. Thus, said more generally, each wireless client device that is to participate in a multi-user transmission, preceded by a multi-user reservation sequence, is configured to generate CTS packets using a scrambling code contained in the MRTS packet so that binary content of the CTS packets sent by these wireless client devices is the same. In some scenarios, the CTS packets are to be sent at the same time and in other scenarios they are sent at different times.

Second, the relative delay of the CTS packets is controlled. The delay depends on the relative distance of clients to the initiator, e.g., the AP 20. Various forms of RTS and CTS packets are transmitted at a rate that is understood by legacy devices and a standard guard interval of 800 ns is used. Considering the coverage intended for an AP and the relative distance of clients to the responder, the relative delay is expected to be within tolerance limits offered by standard guard intervals, making the CTS packets appear as multipath signals to a receiving device. An aggregated multipath channel depends on the location of the receiver and if the receiver is closer to one of the responders, the resulting channel has less multipath contribution from other responders.

Third, to avoid receiving CTS packets with significant carrier frequency offset, the carrier frequency offset of each responder is set to be within a small range so that the effects of varying offset appear within the limit that a device receiving the multiple overlapping CTS packets can handle. One way to achieve this is to configure each STA to determine (measure) a carrier frequency offset with respect to a carrier of the MRTS packet, and then to use that same carrier frequency offset when transmitting a CTS packet.

Thus, in summary, the CTS packets sent by each responder are identical. This is due to: (a) the MAC address content of the CTS packet does not have a transmit address but has a receive address which is set to the address of the initiator, e.g., the AP 20, and is therefore the same for the CTS packets sent by all responders; (b) each responder generates the binary content of the CTS packet using the same deterministic computation from the scrambling code seed of the MRTS packet 70 as explained above; (c) all other fields in the CTS packet are exactly the same.

Thus, the CTS packets from multiple responders are essentially transmissions of the exact same OFDM symbols from several clients, much like a transmission from several distributed antennas. To a given receiving device, the multiple identical CTS packets appear as several delayed copies of the same OFDM symbols with a richer multipath channel, i.e., an aggregate of the multiple paths of the channel between each sender and the receiving device. The receiving device processes the overlapping CTS packets the same way it does any other frame. In fact, the receiving device does not know whether it is receiving a single-user CTS packet or a multiple CTS packets sent from different devices, and as a result there are no additional processing requirements for a receiving device.

Figure 5:
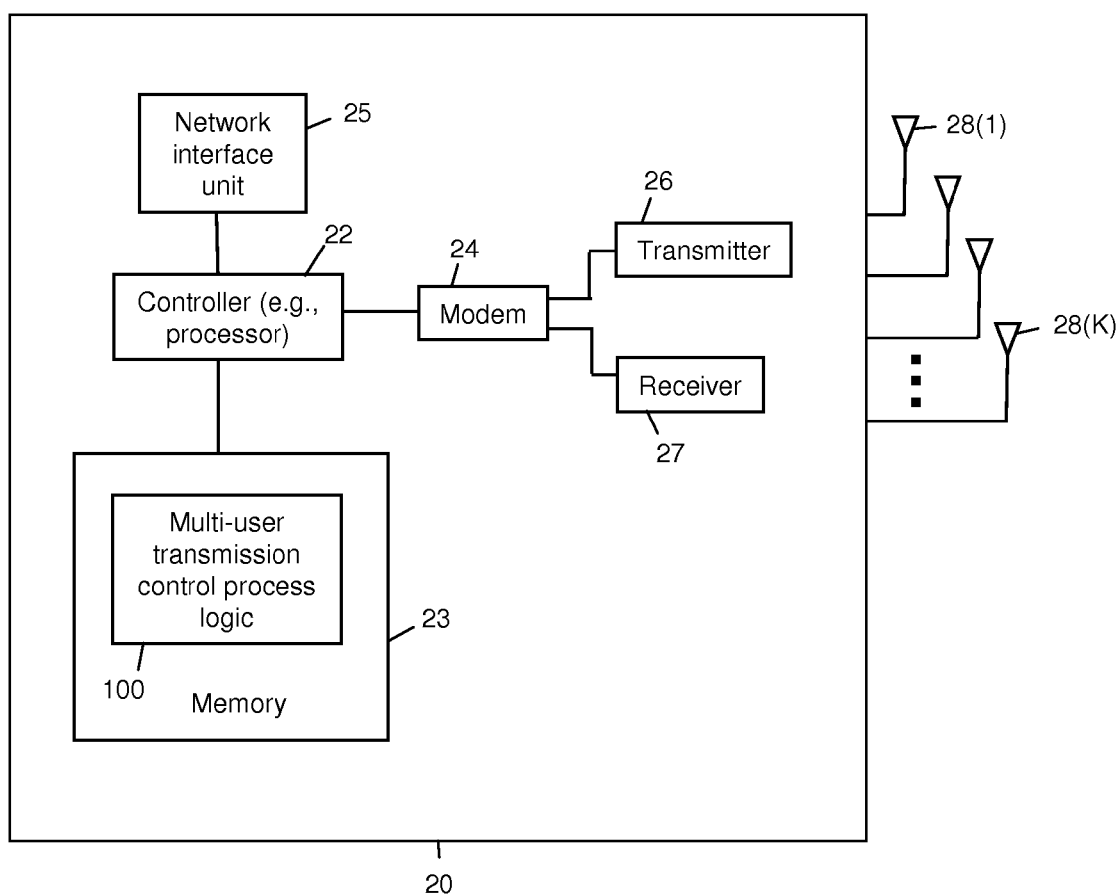
FIG. 5 is an example block diagram of the wireless access point device configured to initiate the multi-user reservation sequence.

Reference is now made to FIG. 5 for a description of an example block diagram of a device, e.g., AP 20, configured to initiate the multi-user reservation techniques. The AP 20 comprises a controller (e.g., processor) 22, a memory 23, a modem 24, a network interface unit 25, a transmitter 26, a receiver 27, and one or more antennas 28(1)-28(K). The controller 22 is the control device for the AP 20. The memory 23 is a memory device that stores instructions for multi-user transmission control process logic 100 that the controller 22 executes. The modem 24 is configured to generate modulated signals (packets or frames) for transmission and to demodulate and recover data from received signals. The network interface unit 25 enables connectivity, e.g., Ethernet connectivity, over a wired network so that the AP can communicate over a local area network and to the Internet, as shown in FIG. 1.

The AP 20 may be configured for MIMO communication techniques and to this end comprises multiple antennas 28(1)-28(K). In addition, to support MIMO communication, the AP 20 would comprise K transmitters each of which supplies upconvert a transmit signal to a corresponding one of the antennas 28(1)-28(K) and K receivers each of which is configured downconvert a received signal from one of the antennas 28(1)-28(K).

In one form, the modem 24 is implemented by a digital logic gates in one or more application specific integrated circuits (ASICs). In other forms, the modem 14 is implemented by a digital signal processor. The controller 22 may be configured to integrate and perform some or all of the functions of the modem 24 and thus be coupled to the transmitter 26 and receiver 27. The memory 23 may comprise read only memory (ROM), random access memory (RAM), magnetic disk storage media devices, optical storage media devices, flash memory devices, electrical, optical, or other physical/tangible memory storage devices. The controller 22 is, for example, a microprocessor or microcontroller that executes instructions for the process logic 100 stored in memory 23. Thus, in general, the memory 23 may comprise one or more computer readable storage media (e.g., a memory device) encoded with software comprising computer executable instructions and when the software is executed (by the controller 22) it is operable to perform the operations described herein in connection with process logic 100.

Figure 6:
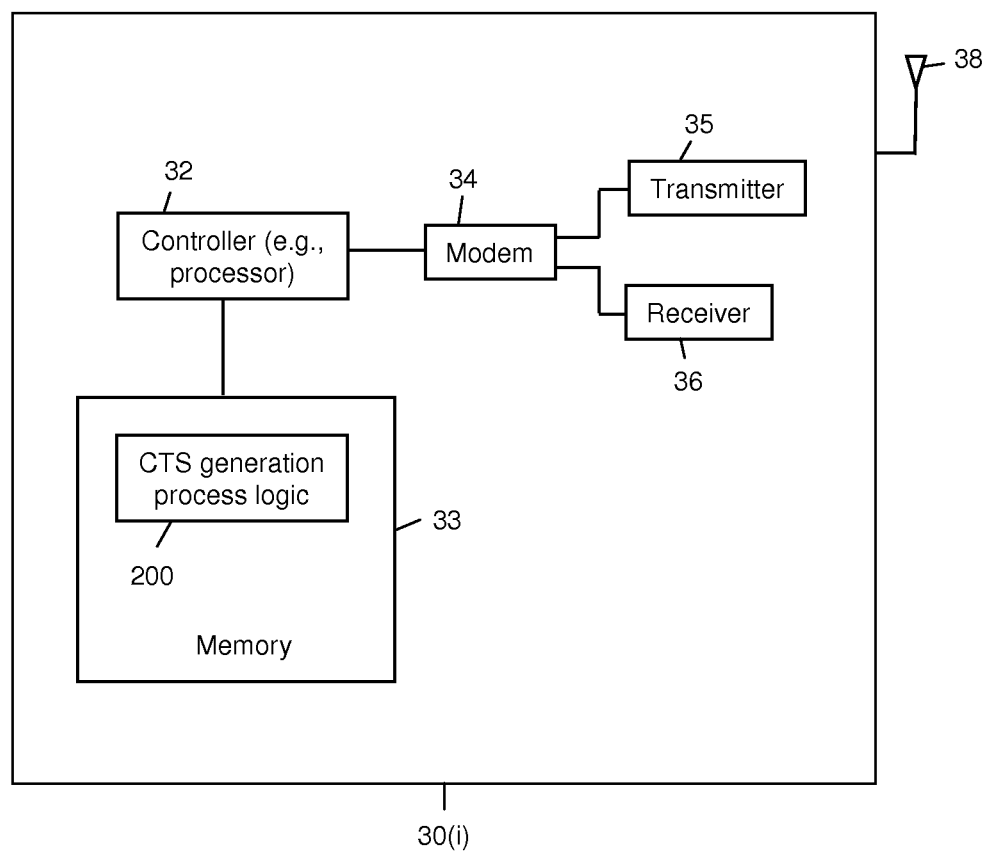
FIG. 6 is an example of diagram of a wireless client device configured to participate in the multi-user reservation sequence.

FIG. 6 shows an example block diagram of a STA, generically identified by reference numeral 30(i). The STA comprises a controller 32, a memory 33, a modem 34, a transmitter 35, a receiver 36 and an antenna 38. These components may take on similar forms as those components in the AP 20 shown in FIG. 5. The memory 33 stores CTS generation process logic 200 that is executed by the controller 32.

FIG. 7 illustrates an example of a flow chart generally depicting operations of the multi-user transmission control process logic 100 in AP 20. At 110, at a wireless access point device configured to operate in a wireless network, an MRTS packet is transmitted as part of a multi-user reservation sequence prior to a multi-user transmission from the wireless access point device to a plurality of wireless client devices that are the intended recipients for the multi-user transmission. The MRTS packet comprises duration information (indicating a duration of the multi-user transmission and thus how long other devices should stay off the wireless medium) and address information configured to address at least some of the plurality of wireless client devices. At 120, the AP receives CTS packets transmitted from two or more of the plurality of wireless client devices in response to the MRTS packet, each CTS packet that is responsive to the multi-user request-to-send packet comprising identical content. At 130, assuming the multi-user reservation sequence is successful, the AP 20 sends the multi-user transmission to the plurality of wireless client devices. The AP 20 may modify the original multi-user transmission depending on whether one or more intended recipients do not respond with a CTS packet.

Turning to FIG. 8, a flow chart is shown that generally depicts operations of the process logic 200 in a wireless client device that is configured to respond to a MRTS packet 70 sent during the multi-user reservation sequence 60. At 210, at a wireless client device configured to operate in a wireless network, an MRTS packet is received that is transmitted by a wireless access point device, the MRTS packet comprising duration information (indicating a duration of a multi-user transmission) and information configured to address some or all of the plurality of wireless client devices that are the intended recipients for the multi-user transmission. At 220, the wireless client device determines whether the MRTS packet is addressed to it. When the wireless client device determines that the received MRTS packet is addressed to it, the wireless client device generates a CTS packet using information contained in the MRTS packet so that the CTS packets sent by the plurality of wireless client devices comprise identical content. As explained above, the wireless client device generates the CTS packet at 220 using a scrambling code seed contained in the MRTS packet so that binary content is the same for the CTS packets sent from wireless client devices in response to the MRTS packet. Moreover, at 220, the wireless client device determines when to transmit the CTS packet based on information contained in the MRTS packet 70, e.g., based on position of the address for the wireless client in the ordered sequence of addresses contained in the field of the multi-user request-to-send packet. When a wireless client device determines that it is not addressed by the MRTS packet, then it nevertheless knows, from the duration information contained in the MRTS packet, to stay off the wireless medium in order not to interfere with the multi-user transmission to other wireless client devices. At 230, the wireless client device transmits the CTS packet generated at 220 at the appropriate time as determined at 220. Furthermore, when transmitting the CTS packet, the wireless client device may use the same carrier frequency offset determined for the received MRTS packet 70. In particular, the controller 32 of the wireless client device determines the carrier frequency offset from the carrier of the received MRTS packet and controls the transmitter 35 to transmit the CTS packet using the same carrier frequency offset.

There are situations in examples of the multi-user reservation sequence described herein when the operations of the wireless client device may involve responding to a standard single-user RTS packet with a standard CTS packet. For simplicity these standard response mechanisms are not described above in connection with FIGS. 7 and 8, but are referred to in connection with certain examples of the multi-user reservation sequence described herein.

Examples of the Multi-User Reservation Sequence

With reference to FIGS. 9-13, several examples of the multi-user reservation sequence 60 are now described. These examples have varying level of efficiency in terms of spectrum usage and sensitivity on the part of devices that need to receive the various packets that are part of the sequence. In some multi-user transmissions, such as IEEE 802.11ac multi-user transmissions, there is a "primary client" and a primary access category (AC) that a transmit opportunity (TXOP) is aimed for, and the remaining clients and their corresponding access categories are considered as "non-primary" or "secondary" AC-holders. It is therefore logical to first focus the RTS/CTS protection mechanism for the primary AC-holder in a multi-user transmission. Described in connection with FIGS. 9-13 are examples of specific operations of the process logic 100 performed by the AP 20 and of the process logic 200 performed by STAs that are intended recipients of a multi-user transmission and are addressed in a MRTS packet sent by the AP 20.

The RTS/CTS+MRTS/CCTS Scenario

Figure 9:
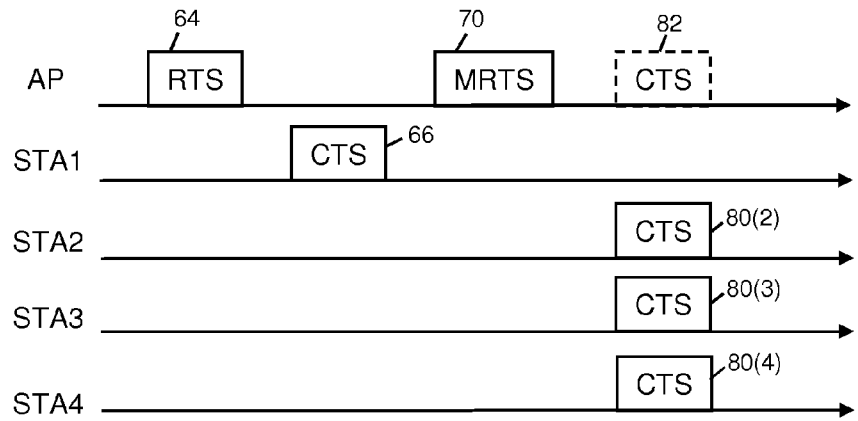
FIGS. 9-13 are examples of timing diagrams illustrating the timing of packets sent by the wireless access point device and wireless client devices during several scenarios of the multi-user reservation sequence.

Reference is now made to FIG. 9 for a description of a first mechanism for the multi-user reservation sequence 60. In this mechanism, a conventional RTS/CTS exchange between the initiator and one of the STAs (e.g., the primary AC-holder) is first performed. In this example, STA1 is the primary AC holder and the recipients for the multi-user transmission are STA1, STA2, STA3 and STA4. Thus, the AP sends a (single-user and standard) RTS packet 64 that is addressed to a designated one (e.g., STA1) of the plurality of STAs for the multi-user transmission. The Duration field of the RTS packet 64 is set to account for the multi-user transmission after completion of the reservation sequence, and the Recipient Address of the RTS packet is set to the address of the designated STA, e.g., STA1, to provoke that designated STA to transmit a standard CTS packet 66 in response to the RTS packet 64. When the designated STA receives the RTS packet, it sends a standard CTS packet 66. During the RTS/CTS exchange at 64 and 66, all devices in RF proximity of the initiator and the responder, including legacy devices, become aware of the upcoming transmission and set their NAVs accordingly. If the AP does not receive the CTS 66, it resets the NAV. Moreover, if the initiator does not receive the CTS 66 then it does not send the MRTS packet 70, and consequently other devices in RF proximity also reset their NAVs.

Assuming success of the initial RTS/CTS exchange, the initiator sends an MRTS packet 70 addressed to the remaining clients (STA2, STA3 and STA4). The MRTS packet 70 uses one of the configurations described above in connection with FIG. 4 so as to include address information for STA2, STA3 and STA4, and to indicate that all of the clients are to respond at the same time with a CTS packet an SIFS interval after the MRTS packet (which may be a default configuration of the MRTS packet 70 in this example). When these clients receive the MRTS packet 70, they respond with identical CTS packets 80(2), 80(3) and 80(4) after an SIFS interval, resulting in collided CTSs as described above. (The CTS packet 66 sent by the designated STA during the initial RTS/CTS phase is a standard CTS packet and is therefore different from the CTS packets 80(2)-80(4) sent by the other STAs.) For additional protection, the AP 20 may also send a CTS to itself as shown at 82 in FIG. 9, and configured to be identical to the CTS packets 80(2)-80(4) as described above. All other devices in RF proximity, receive the CTS packets 80(2), 80(3), 80(4) and 82 and detect it as a legacy CTS packet and continue with the NAV setting that had been set based on the MRTS packet 70. This phase protects each of the responders from possible interfering packets by other devices in their RF proximity, particularly in OBSS scenarios. The CCTS effect achieved by the multiple colliding CTS packets 80(2)-80(4) is a much more efficient use of the spectrum than a series of CTS packets. If a device misses any of the CTS packets 80(2)-80(4) during this phase, but detects the initial RTS/CTS exchange, then the device would have set its NAV from the initial RTS/CTS exchange and would not attempt to contend for the medium during the multi-user transmission. Thus, in summary, the scenario of FIG. 9 involves, at the AP 20, transmitting a standard single-user RTS packet that is addressed to a designated one of the plurality of wireless client devices that are intended recipients of a multi-user transmission, determining whether a CTS packet is received from the designated wireless client device, and after it is determined that the CTS packet is received from the designated wireless client device, transmitting the MRTS packet comprising information configured to address the remaining wireless client devices of the plurality of wireless client devices that are the intended recipients for the multi-user transmission. As explained above, the designated wireless client device may be the primary wireless client device for the multi-user transmission.

The RTS/CTS+MRTS/CTS/CTS Scenario

Figure 10:
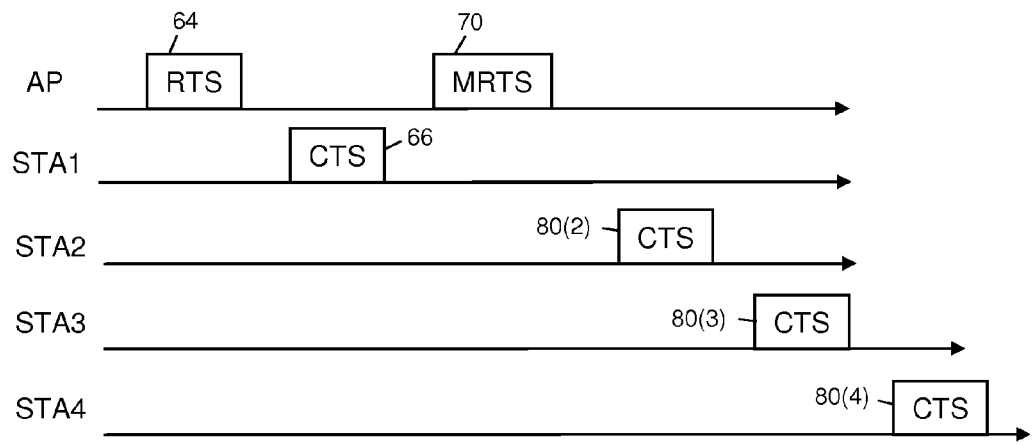

Referring now to FIG. 10, another mechanism is shown that also initially uses a standard RTS/CTS exchange to a designated one of the multi-user recipients, e.g., the primary AC holder. Again, in this example, STA1 is the primary AC holder and STA1, STA2, STA3 and STA4 are all intended recipients of the multi-user transmission. The initial RTS/CTS exchange operates as described above in connection with FIG. 9. Assuming success of the initial RTS/CTS exchange, the initiator sends an MRTS packet 70 addressed to the remaining clients (STA2, STA3 and STA4). The MRTS packet 70 uses one of the configurations described above in connection with FIG. 4 so as to include address information for STA2, STA3 and STA4, and to indicate an order for respective ones of the STAs to transmit their CTS packets at different times so that the CTS packets 80(2), 80(3) and 80(4) do not overlap in time. The order for the STAs to respond with their CTS packets is contained in the MRTS packet 70 using any of the techniques described above in connection with FIG. 4. For example, the order of the MRAs for STA2, STA3 and STA4 in the MRTS packet 70 is used to indicate the CTS response order. Alternatively, the order for CTS response is implied based on a GID to which STA1, STA2, STA3 and STA4 are assigned. The spacing between RTS packet 64 and CTS packet 66 is the SIFS interval Likewise, the spacing between the MRTS packet 70 and the first CTS packet 80(2) from STA2 is an SIFS interval, as is the spacing between the remaining CTS packets 80(3) and 80(4). The CTS packets 80(2), 80(3) and 80(4) transmitted by STA2, STA3 and STA4, respectively, are identical as described above. The devices surrounding each of the responders detect the CTS packets 80(2)-80(4) and set their NAVs accordingly. If a device misses any of the CTS packets 80(2)-80(4) during this phase, it would have set its NAV from the initial RTS/CTS exchange and thus would not attempt to contend for the medium. Regardless of whether any CTS packet is missed during this phase, the initiator, e.g., AP 20, knows when to start sending the data packets, and can modify the multi-user transmission to include only those recipient devices that have replied with a CTS packet. In this scenario, the CTSs are identical to each other but do not collide and this eases the requirements on the physical hardware of the surrounding devices (other STAs, APs, etc.). Thus, the scenario of FIG. 10 is similar to that of FIG. 9 except that the MRTS packet is generated to include information indicating an order for respective ones of the other client devices (those STAs other than the primary STA that is covered by the initial RTS/CTS exchange) to transmit their identical CTS packets at different times so that they do not overlap in time.

The RTS/CTS+MRTS/CCTS/CCTS Scenario

Figure 11:
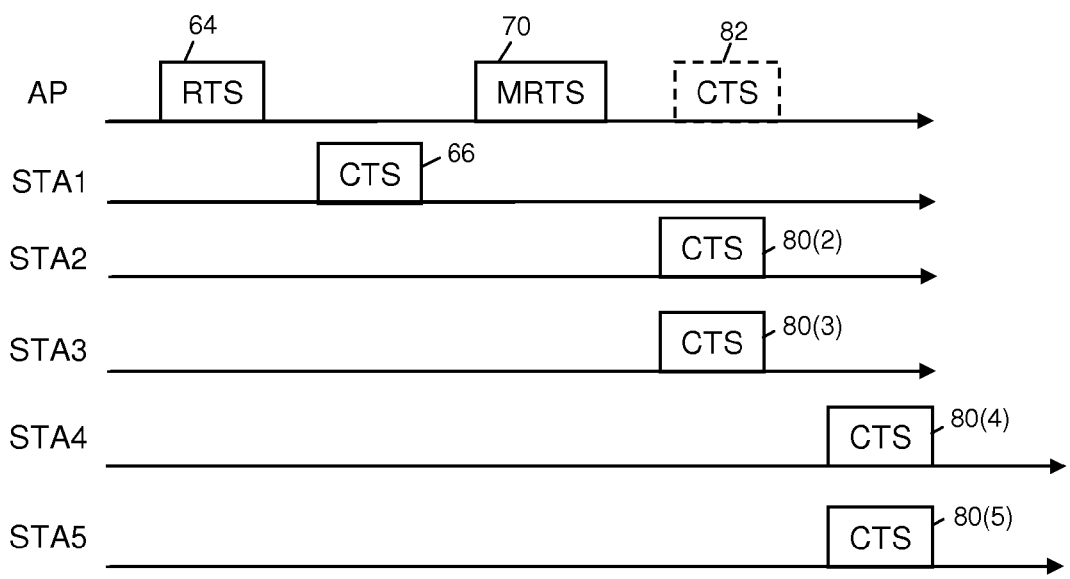

Reference is now made to FIG. 11 for a description of yet another mechanism. In this example, STA1 is the primary AC holder and STA1, STA2, STA3, STA4 and STA5 are all intended recipients of a multi-user transmission. This mechanism also uses an initial RTS/CTS exchange directed to a designated STA, like that described above in connection with FIGS. 9 and 10. Assuming success of the initial RTS/CTS exchange, the initiator sends an MRTS packet 70 addressed to the remaining clients (STA2, STA3, STA4 and STA5). The MRTS packet 70 uses one of the configurations described above in connection with FIG. 4 so as to include address information for STA2, STA3, STA4 and STA5, and to indicate to the remaining clients that they respond with CTS packets in a scheduled fashion, whereby subsets of the remaining clients are scheduled to send their identical CTS packets at the same time, resulting in multiple instances of collided CTSs. The MRTS packet 70 is configured, using any of the techniques described above in connection with FIG. 4, to indicate an order for respective ones of the STAs to transmit their identical CTS packets so that CTS packets from different groups or subsets of two or more of the STAs at least partially overlap in time. For example, the MRTS packet 70 is configured to indicate that a first subset or group of STAs comprising STA2 and STA3 are to transmit their CTS packets 80(2) and 80(3), respectively, first after the MRTS packet 70 and at the same time (or at least partially overlapping in time), and a SIFS interval later, a second subset or group of STAs comprising STA4 and STA5 are to transmit their CTS packets 80(4) and 80(5), respectively, at the same time. The multiple partially colliding CTS packets eases the physical hardware requirements from a situation where all of the STAs send their identical CTS packets at the same time. Thus, the scenario of FIG. 11 involves generating the MRTS packet comprising information indicating an order by which a first group of at least two wireless client devices of the remaining wireless client devices are to transmit their clear-to-send packets at the same time and thereafter a second group of at least two wireless client devices of the remaining wireless client devices are to transmit their clear-to-send packets at the same time.

The technique shown in FIG. 11 of scheduling subsets of STAs to transmit at the same time may be employed separately from the initial RTS/CTS exchange. In this case, the MRTS packet is generated to include information indicating an order by which a first group of at least two wireless client devices of the plurality of wireless client devices are to transmit their CTS packets at the same time and thereafter a second group of at least two wireless client devices of the plurality of wireless client devices are to transmit their CTS packets at the same time. This could be extended to more than two groups of subsets.

The MRTS/CTS/CCTS Scenario

Figure 12:
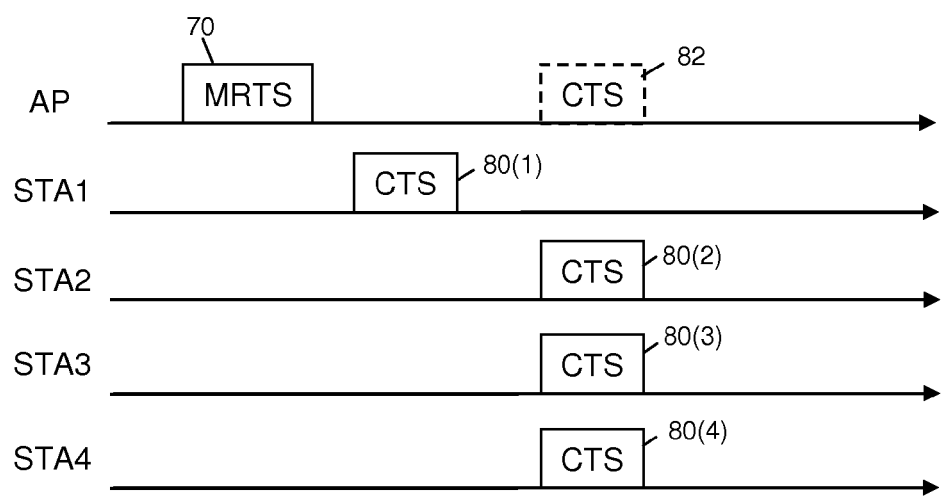

Reference is now made to FIG. 12 for still another mechanism. This mechanism begins with the AP sending an MRTS packet 70 to the intended recipient clients, which in this example, are STA1, STA2, STA3 and STA4. The MRTS packet 70 is addressed to STA1-STA4 and configured to indicate an order for the STAs to respond with CTS packets such that a designated one of the STAs, STA1 in this example, is the first-to-respond client (e.g., the first addressed client in MRTS packet). This designated client may be the primary AC-holder of the TXOP. Thus, the designated client responds to the MRTS packet by transmitting a CTS packet 80(1) separately, which results in providing protection to this responder. The MRTS packet 70 is also configured to indicate to the remaining clients, e.g., STA2, STA3 and STA4, to wait for the first CTS packet 80(1) to be sent and then, together with the AP, after an SIFS interval, send their own CTS packets 80(2), 80(3) and 80(4) simultaneously, resulting in a CCTS situation. The AP's CTS packet is shown at 82. Because the AP is a sender, all other devices that receive CTS packets 80(2)-80(4) and 82 detect them as a legacy CTS packet and continue with the NAV setting that had been set on the basis of the MRTS packet 70. This protects each of the responders from possible interfering packets by the devices in RF proximity, and is particularly useful for OBSS scenarios. All non-recipient devices that detect the MRTS packet 70 set their NAVs as long as the address indicated in MRTS appears as a MAC address using the techniques described herein (and does not match an address of any other device in the BSS), thereby ensuring that the MRTS packet is legacy compatible. Thus, the scenario of FIG. 12 involves transmitting the MRTS packet comprising information indicating that a designated one of the plurality of wireless client devices first (and in isolation or separately) transmits a CTS packet and thereafter the remaining wireless client devices are to transmit their CTS packets at substantially the same time.

The MRTS/CCTS Scenario

Figure 13:
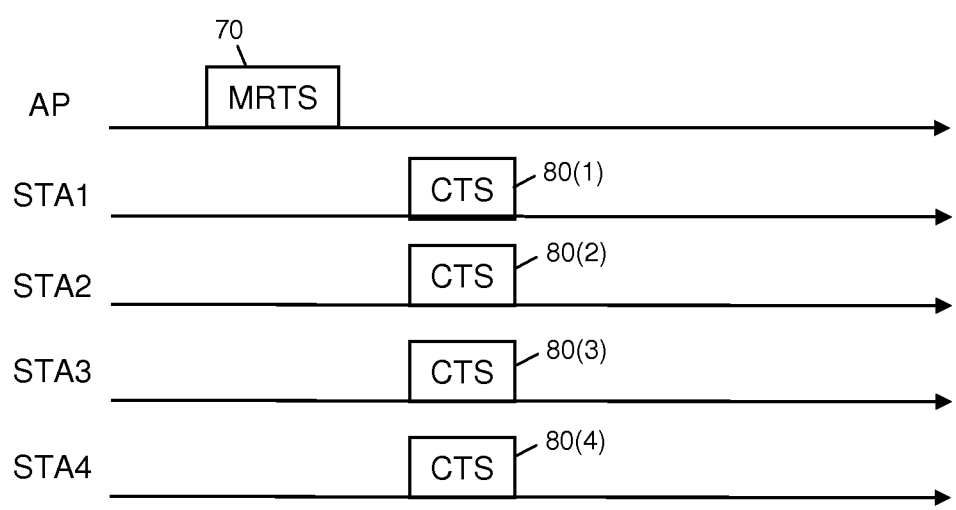

Reference is now made to FIG. 13. The mechanism shown in FIG. 13 is similar to that shown in FIG. 12 except that all the intended recipient devices of the multi-user transmission are treated the same for purposes of the reservation scheme. The AP sends an MRTS packet 70 addressed to all the intended clients/responders, e.g., STA1-STA4. All devices that detect the MRTS packet 70 set their NAVs. All the responders each send a CTS packet after an SIFS interval following the MRTS packet 70 resulting in a CCTS situation. Thus, STA1-STA4 transmit their CTS packets 80(1)-80(4), respectively, at substantially the same time. All other devices that receive the collided CTS packets 80(1)-80(4) detect them as a legacy CTS packets and continue with the NAV setting they had set from the MRTS packet 70. As in the scenario of FIG. 12, this protects each of the responders from possible interfering packets sent by the devices in their RF proximity, particularly in OBSS scenarios.

In one form, an AP is configured to use one of the methods described above in connection with FIGS. 9-13 and the APs/clients in RF proximity would follow the rules of one of these methods, either as a legacy device (in which case no changes to the device are needed) or as a multi-user participant device in which case the device is configured to interpret the information sent by the AP and respond with a CTS packet as explained herein. In another form, the AP may be configured to employ any one of the foregoing methods and may broadcast in advance which method it is using for an upcoming multi-user transmission and that it will continue to use that method until it sends another broadcast message indicating that a different method is to be used. The message announcing the type of multi-user reservation sequence may be sent by the AP in a Beacon frame, for example.

The techniques described herein provide for several RTS/CTS exchange mechanisms for multi-user and other transmission aggregation applications. The mechanisms described herein use an MRTS packet, in which multiple responders are listed or identified, in some cases preceded by a conventional RTS/CTS exchange, and a collided CTS scheme in which multiple identical CTS packets are sent by responders simultaneously but are detected by receivers as a single CTS packet. These mechanisms are designed to ensure that devices surrounding the initiator and all responders become aware of upcoming packet exchange and set their NAVs accordingly. Furthermore, the multi-user reservation mechanisms described herein consume less time on the wireless medium, provide protection for all recipient devices against so-called "hidden" nodes in their RF proximity, and preserve the NAV reset rule.

The techniques described herein may be embodied as a method, an apparatus and one or more computer readable storage media one or more computer readable storage media (e.g., a memory device) encoded with software comprising computer executable instructions and when the software is executed (by a processor) it is operable to perform the operations described herein at a wireless access point device or wireless client device.

In terms of an apparatus configured to serve or operate as a wireless access point device, an apparatus is provided that comprises a transmitter configured to upconvert transmit signals for wireless transmission; a receiver configured to generate receive signals from signals detected by one or more antennas; and a controller configured to be coupled to the transmitter and receiver. The controller is configured to generate for transmission by the transmitter a multi-user request-to-send packet as part of a multi-user reservation sequence prior to a multi-user transmission from the wireless access point device to a plurality of wireless client devices that are the intended recipients for the multi-user transmission, the multi-user request-to-send packet comprising duration information and address information configured to address at least some of the plurality of wireless client devices; and detect clear-to-send packets received from two or more of the plurality of wireless client devices in response to the multi-user request-to-send packet, each clear-to-send packet being comprising identical content.

Similarly, in terms of an apparatus that is configured to operate as a wireless client device, an apparatus is provided comprising a transmitter configured to upconvert transmit signals for wireless transmission; a receiver configured to generate receive signals from signals detected by one or more antennas; and a controller configured to be coupled to the transmitter and receiver. The controller is configured to detect a multi-user request-to-send packet transmitted by a wireless access point device, the multi-user request-to-send packet comprising duration information and address information configured to address at least some of the plurality of wireless client devices that are the intended recipients for the multi-user transmission; when the multi-user request-to-send packet is determined to be addressed to the apparatus, generate a clear-to-send packet using information contained in the multi-user request-to-send packet so that the clear-to-send packets sent by the plurality of wireless client devices comprise identical content; and supply the clear-to-send packet to the transmitter for transmission.

While the foregoing techniques are described herein with respect to a wireless access point and wireless client devices in a WLAN, this is only an example and they may be applicable in other wireless network environments, e.g., WiMAX™ systems, that use "base stations" with similar responsibilities as a WLAN AP and mobile stations that are similar to WLAN STAs.

The above description is intended by way of example only.

What is claimed is:

1. A method comprising:
   at a wireless access point device configured to operate in a wireless network, transmitting a multi-user request-to-send packet as part of a multi-user reservation sequence prior to a multi-user transmission from the wireless access point device to a plurality of wireless client devices that are the intended recipients for the multi-user transmission, the multi-user request-to-send packet comprising duration information, address information configured to address at least some of the plurality of wireless client devices and information indicating that a designated one of the plurality of wireless client devices is to first transmit a clear-to-send packet after the multi-user request-to-send packet and thereafter the remaining wireless client devices are to transmit their clear-to-send packets at substantially the same time; and
   receiving clear-to-send packets transmitted from two or more of the plurality of wireless client devices in response to the multi-user request-to-send packet.

2. The method of claim 1, and further comprising sending the multi-user transmission after determining that a clear-to-send packet is received from each of the plurality of wireless client devices.

3. The method of claim 1, and further comprising generating the multi-user request-to-send packet comprising the address information configured to be construed by devices that are not intended recipients of the multi-user transmission as an address field in a standard request-to-send packet.

4. The method of claim 1, and further comprising generating the multi-user request-to-send packet such that the address information configured to address at least some of the plurality of wireless client devices is based on a function of the medium access control (MAC) address of the respective wireless client devices.

5. The method of claim 1, and further comprising generating the multi-user request-to-send packet such that the address information configured to address at least some of the plurality of wireless client devices is based on a function of the an association identifier for the respective wireless client devices.

6. The method of claim 1, and further comprising generating the multi-user request-to-send packet such that the address information configured to address at least some of the plurality of wireless client devices is based on a function of a group identifier assigned to the plurality of wireless client devices for the multi-user transmission.

7. The method of claim 1, and further comprising at each wireless client device, determining a carrier frequency offset with respect to a carrier of the received multi-user request-to-send packet, and transmitting the clear-to-send packet using the carrier frequency offset.

8. The method of claim 1, and further comprising each of the plurality of wireless client devices that receives the multi-user request-to-send packet generating the clear-to-send packet using a scrambling code contained in the multi-user request-to-send packet so that binary content of the clear-to-send packets sent by the plurality of wireless client devices is the same.

9. The method of claim 1, and further comprising generating the multi-user request-to-send packet including information indicating an order for respective ones of the plurality of wireless client devices to transmit their clear-to-send packets, wherein the order is indicated by order of client device address information contained in a field of the multi-user request-to-send packet.

10. A method comprising:
    at a wireless access point device configured to operate in a wireless network, transmitting a request-to-send packet that is addressed to a designated one of the plurality of wireless client devices to provoke the designated wireless client device to transmit a clear-to-send packet in response to the request to send packet;
    determining whether a clear-to-send packet is received from the designated wireless client device;
    after it is determined that the clear-to-send packet is received from the designated wireless client device, transmitting a multi-user request-to-send packet as part of a multi-user reservation sequence prior to a multi-user transmission from the wireless access point device to a plurality of wireless client devices that are the intended recipients for the multi-user transmission, the multi-user request-to-send packet comprising duration information and address information configured to address the remaining wireless client devices of the plurality of wireless client devices that are the intended recipients for the multi-user transmission; and
    receiving clear-to-send packets transmitted from two or more of the plurality of wireless client devices in response to the multi-user request-to-send packet.

11. The method of claim 10, wherein transmitting the request-to-send packet to the designated wireless client device comprises transmitting the request-to-send packet addressed to a wireless client device that has been assigned primary access holder for the multi-user transmission.

12. The method of claim 10, and further comprising generating the multi-user request-to-send packet including information indicating an order for respective ones of the other plurality of wireless client devices to transmit their clear-to-send packets at different times.

13. The method of claim 10, and further comprising generating the multi-user request-to-send packet including information indicating an order by which a first group of at least two wireless client devices of the remaining wireless client devices are to transmit their clear-to-send packets at the same time and thereafter a second group of at least two wireless client devices of the remaining wireless client devices are to transmit their clear-to-send packets at the same time.

14. The method of claim 10, and further comprising generating the multi-user request-to-send packet including information indicating that a designated one of the plurality of wireless client devices is to first transmit a clear-to-send packet after the multi-user request-to-send packet and thereafter the remaining wireless client devices are to transmit their clear-to-send packets at substantially the same time.

15. The method of claim 10, and further comprising generating the multi-user request-to-send packet including information indicating that all of the remaining wireless client devices that are the intended recipients of the multi-user transmission are to transmit their clear-to-send packets at substantially the same time.

16. A method comprising:
at a wireless access point device configured to operate in a wireless network, transmitting a multi-user request-to-send packet as part of a multi-user reservation sequence prior to a multi-user transmission from the wireless access point device to a plurality of wireless client devices that are the intended recipients for the multi-user transmission, the multi-user request-to-send packet comprising duration information, address information configured to address at least some of the plurality of wireless client devices and information indicating an order by which a first group of at least two wireless client devices of the plurality of wireless client devices are to transmit their clear-to-send packets at the same time and thereafter a second group of at least two wireless client devices of the plurality of wireless client devices are to transmit their clear-to-send packets at the same time; and
receiving clear-to-send packets transmitted from two or more of the plurality of wireless client devices in response to the multi-user request-to-send packet.

17. A method comprising:
at a wireless access point device configured to operate in a wireless network, transmitting a multi-user request-to-send packet as part of a multi-user reservation sequence prior to a multi-user transmission from the wireless access point device to a plurality of wireless client devices that are the intended recipients for the multi-user transmission, the multi-user request-to-send packet comprising duration information and address information configured to address at least some of the plurality of wireless client devices;
receiving clear-to-send packets transmitted from two or more of the plurality of wireless client devices in response to the multi-user request-to-send packet; and
transmitting a clear-to-send packet from the wireless access point device at the time that two or more of the plurality of wireless client devices are to transmit clear-to-send packets in response to the multi-user request-to-send packet.

18. A method comprising:
at a wireless client device configured to operate in a wireless network, receiving a multi-user request-to-send packet transmitted by a wireless access point device, the multi-user request-to-send packet comprising duration information and address information configured to address at least some of the plurality of wireless client devices that are the intended recipients for the multi-user transmission;
when the multi-user request-to-send packet is determined to be addressed to the wireless client device, generating a clear-to-send packet using information contained in the multi-user request-to-send packet;
determining a carrier frequency offset with respect to a carrier of the received multi-user request-to-send packet; and
transmitting the clear-to-send packet using the carrier frequency offset from the wireless client device.

19. The method of claim 18, wherein generating comprises generating the clear-to-send packet using a scrambling code contained in the multi-user request-to-send packet so that binary content of the clear-to-send packet is the same for the clear-to-send packets sent from wireless client devices in response to the multi-user request-to-send packet.

20. The method of claim 18, wherein the multi-user request-to-send packet comprises a field containing an ordered sequence of addresses for the intended recipients of the multi-user transmission, and further comprising determining when to transmit the clear-to-send packet from the wireless client device based on position of the address for the wireless client in the ordered sequence of addresses contained in the field of the multi-user request-to-send packet.

21. An apparatus comprising:
a transmitter configured to upconvert transmit signals for wireless transmission;
a receiver configured to generate receive signals from signals detected by one or more antennas; and
a controller configured to be coupled to the transmitter and receiver, wherein the controller is configured to:
generate for transmission by the transmitter a multi-user request-to-send packet as part of a multi-user reservation sequence prior to a multi-user transmission from the wireless access point device to a plurality of wireless client devices that are the intended recipients for the multi-user transmission, the multi-user request-to-send packet comprising duration information, address information configured to address at least some of the plurality of wireless client devices and information indicating that a designated one of the plurality of wireless client devices is to first transmit a clear-to-send packet after the multi-user request-to-send packet and thereafter the remaining wireless client devices are to transmit their clear-to-send packets at substantially the same time; and
detect clear-to-send packets received from two or more of the plurality of wireless client devices in response to the multi-user request-to-send packet.

22. The apparatus of claim 21, wherein the controller is further configured to generate for transmission by the transmitter a request-to-send packet that is addressed to the designated one of the plurality of wireless client devices to provoke the designated wireless client device to transmit a clear-to-send packet in response to the request-to-send packet, determine whether a clear-to-send packet is received from the designated wireless client device, and after it is determined that the clear-to-send packet is received from the designated wireless client device, supply the multi-user request-to-send packet for transmission by the transmitter, the multi-user request-to-send packet comprising information configured to address the remaining wireless client devices of the plurality of wireless client devices that are the intended recipients for the multi-user transmission.

23. An apparatus comprising:

a transmitter configured to upconvert transmit signals for wireless transmission;

a receiver configured to generate receive signals from signals detected by one or more antennas; and a controller configured to be coupled to the transmitter and receiver, wherein the controller is configured to:

generate for transmission by the transmitter a multi-user request-to-send packet as part of a multi-user reservation sequence prior to a multi-user transmission from the wireless access point device to a plurality of wireless client devices that are the intended recipients for the multi-user transmission, the multi-user request-to-send packet comprising duration information, address information configured to address at least some of the plurality of wireless client devices and information indicating an order by which a first group of at least two wireless client devices of the plurality of wireless client devices are to transmit their clear-to-send packets at the same time and thereafter a second group of at least two wireless client devices of the plurality of wireless client devices are to transmit their clear-to-send packets at the same time; and detect clear-to-send packets received from two or more of the plurality of wireless client devices in response to the multi-user request-to-send packet.

24. An apparatus comprising:

a transmitter configured to upconvert transmit signals for wireless transmission;

a receiver configured to generate receive signals from signals detected by one or more antennas; and a controller configured to be coupled to the transmitter and receiver, wherein the controller is configured to:

detect a multi-user request-to-send packet transmitted by a wireless access point device, the multi-user request-to-send packet comprising duration information and address information configured to address at least some of the plurality of wireless client devices that are the intended recipients for the multi-user transmission;

determine a carrier frequency offset with respect to a carrier of the received multi-user request-to-send packet;

when the multi-user request-to-send packet is determined to be addressed to the apparatus, generate a clear-to-send packet using information contained in the multi-user request-to-send packet; and supply the clear-to-send packet to the transmitter for transmission using the carrier frequency offset.

25. The apparatus of claim 24, wherein the controller is configured to generate the clear-to-send packet using a scrambling code contained in the multi-user request-to-send packet so that binary content of the clear-to-send packet is the same for the clear-to-send packets sent from wireless client devices in response to the multi-user request-to-send packet.

26. The apparatus of claim 24, wherein the controller is further configured to determine when to transmit the clear-to-send packet based on position of an address in an ordered sequence of addresses contained in a field of the multi-user request-to-send packet.

27. A non-transitory computer readable storage media encoded with software comprising executable instructions and when executed operate to:

generate a multi-user request-to-send packet comprising duration information, address information configured to address at least some of a plurality of wireless client devices and information indicating that a designated one of the plurality of wireless client devices is to first transmit a clear-to-send packet after the multi-user request-to-send packet and thereafter the remaining wireless client devices are to transmit their clear-to-send packets at substantially the same time;

causing a wireless access point device in a wireless network to transmit the multi-user request-to-send packet as part of a multi-user reservation sequence prior to a multi-user transmission from the wireless access point device to the plurality of wireless client devices that are the intended recipients for the multi-user transmission; and receive at the wireless access point device clear-to-send packets transmitted from two or more of the plurality of wireless client devices in response to the multi-user request-to-send packet.

28. The non-transitory computer readable storage media of claim 27, wherein the instructions operable to generate the multi-user request-to-send packet comprise instructions operable to include in the multi-user request-to-send packet information indicating that all the remaining wireless client devices that are the intended recipients of the multi-user transmission are to transmit their clear-to-send packets at substantially the same time.

* * * * *